Oct. 7, 1958 H. J. VOLLMER 2,854,941
PIPE AND FITTING SUPPORT FOR WELDING
Filed Sept. 8, 1954 2 Sheets-Sheet 1
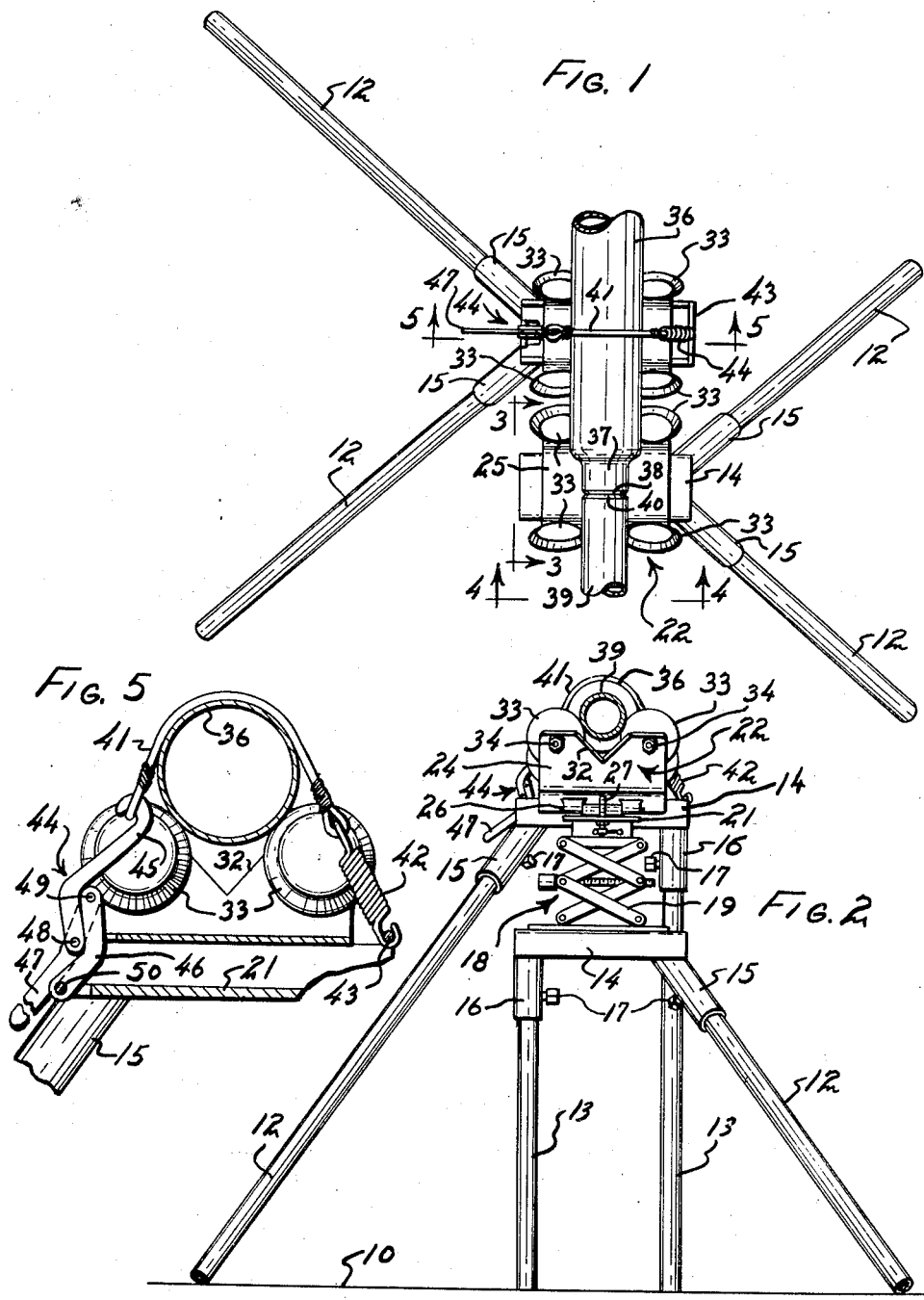
INVENTOR
HARRY J. VOLLMER
BY Williamson, Williamson,
Schroeder & Adams
ATTORNEYS Oct. 7, 1958     H. J. VOLLMER     2,854,941
PIPE AND FITTING SUPPORT FOR WELDING
Filed Sept. 8, 1954     2 Sheets-Sheet 2
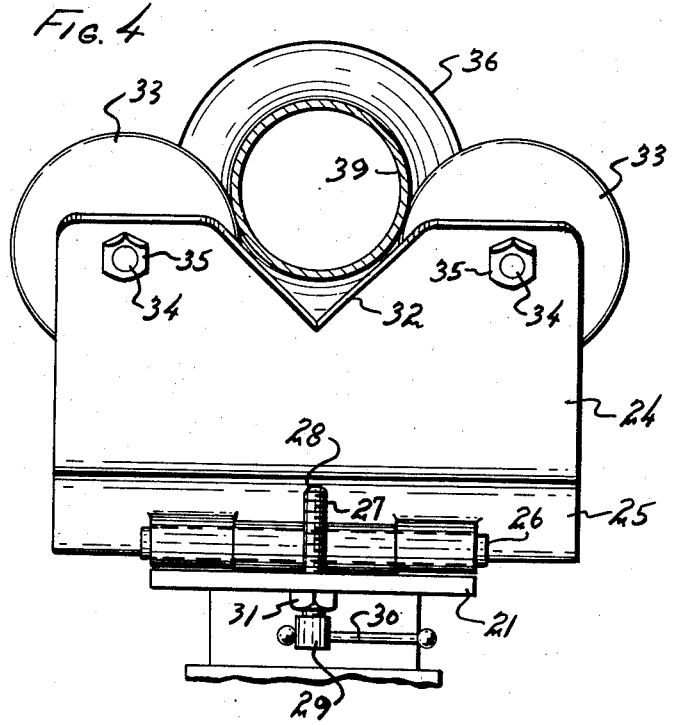
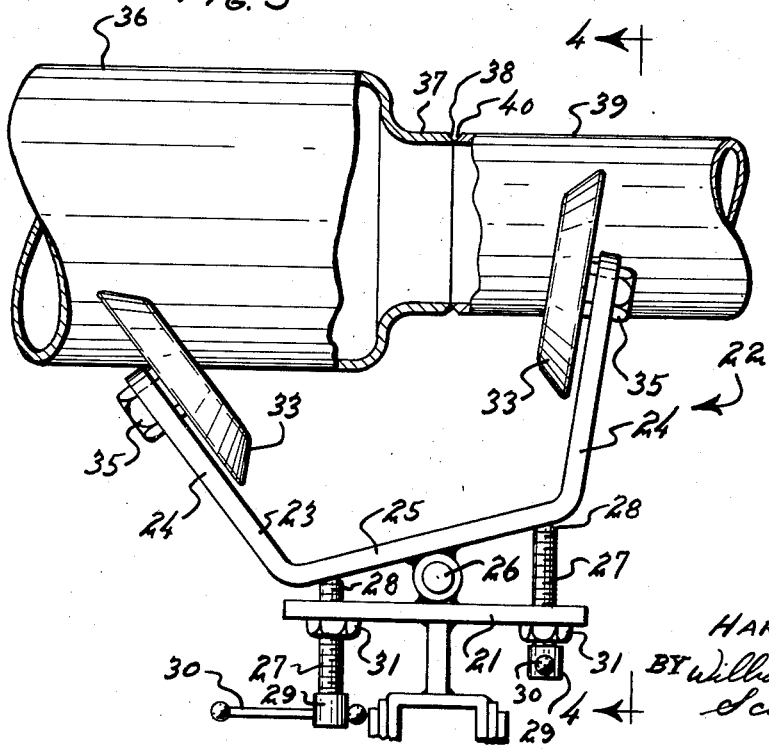
INVENTOR
HARRY J. VOLLMER
BY Williamson, Williamson,
Schroeder & Adams
ATTORNEYS

United States Patent Office

2,854,941
Patented Oct. 7, 1958

2,854,941

PIPE AND FITTING SUPPORT FOR WELDING

Harry J. Vollmer, Minneapolis, Minn.

Application September 8, 1954, Serial No. 454,720

2 Claims. (Cl. 113—102)

This invention relates to supports, and more particularly to supporting mechanism for use in aligning and during welding of pipes and pipe fittings.

Where pipes and fittings for carrying water, steam, air and the like have a diameter which makes the threaded connection unwieldy, it has become the practice to weld such pipes and fittings at their connecting joints. The welded pipes and fittings have many advantages which are well-known in the art and the superiority of welded connections for large work pieces is well-established. The superiority of welding is, however, predicated upon the skill of the workman and the thorough and careful nature of the welded connection. In the art of welding pipes and fittings, it has been common practice to lay the pieces to be welded upon the floor or blocked slightly upwardly from the floor so that the pipe members may be rolled forth and back to expose the joint as it is welded. Where fitting such as T's and elbows are welded to pipe lengths, the projecting portion of the fitting is usually left in an upwardly extending position until the weld has been partially completed at the exposed side. The pipe and fitting is then blocked or turned with the projection resting on the floor or overhanging the block while the weld is completed. In performing a welding operation in such a manner, the workman must crouch in an uncomfortable position to accomplish his job, and whenever the pipe is turned with the pressure applied thereto there is danger of misaligning the pieces to be welded. Even the initial alignment is uncertain and often the workman is forced to do a poor job of tacking the pieces to be welded because some sides of the members are inaccessible or difficult to reach. In many instances, it is just as easy for the workman to do all his welding by "position" welding in which the pipes and fittings are elevated directly to their final position and welded together in this fixed relation with a supporting structure and the previously installed pipes. In any event a welder must make some "position" welds, but as a rule these may be minimized. "Position" welding requires that the piece be held rigidly and there is no opportunity to turn the work so as to expose the opposite side of a circular weld and the workman, as a result, must himself move around the joint as it is welded. It is within the contemplation of this invention to make it easier for a welder to accomplish the bulk of his welding, especially the addition of fittings and fixtures to pipe lengths prior to mounting for "position" welds.

It is therefore an important object of the present invention to provide a support device which will simplify and improve the aligning and welding of pipes and fittings.

Another object of the invention is to provide mechanism for supporting and aligning pipes and fittings at a convenient height for welding by a workman.

A further object of the invention is to provide a support device which is adjustable for leveling pipes and the like to be welded at an elevated position and for accommodating pieces of different diameter adjacent the joint to be welded.

Another object is to provide mechanism of the class described in which aligned, concentric relation of pipes and fittings to be welded can be maintained at a convenient height while permitting free simultaneous rotation of the pieces during welding.

A still further object is to provide a plurality of supports for welding pieces in aligned and rotatable condition which supports have quick and convenient adjustability with interesting structure for close work.

These and other objects and advantages of the invention will more fully appear from the following description made in connection with the accompanying drawings, wherein like reference characters refer to the same or similar parts throughout the several views, and in which:

Fig. 1 is a top plan view of a pair of my support devices in operative position, a section of a pipe length having a reduced portion adjacent the weld joint being shown in supported relation to a section of another pipe of smaller diameter abutting the first at said weld joint;

Fig. 2 is a side elevation of the support devices shown in Fig. 1;

Fig. 3 is an enlarged view of the cradle member taken on the line 3—3 of Fig. 1, portions of the pieces to be welded being cut away to show the concentric relation at the weld joint;

Fig. 4 is a view taken at right angles to that shown in Fig. 3, certain portions thereof being shown in section and others cut away, the view being taken on the line 4—4 of Figs. 1 and 3 and looking in the direction of the arrows; and Fig. 5 is an enlarged segmental detail of the clamping structure taken on the line 5—5 of Fig. 1.

With continued reference to the drawings, my invention contemplates a support device which is adapted to be placed on a supporting surface such as the floor 10 and having a stand indicated generally at 11 with depending leg members 12 which are preferably angulated outwardly and downwardly as shown in Figs. 1 and 2. A third leg 13 is substantially vertical and preferably is positioned intermediate the other two legs 12. The legs 12 and 13 have secured at their upper ends a platform 14 which lies in elevated relationship to the floor 10. The legs 12 and 13 are rendered independently adjustable by sliding movement within the respective sleeves 15 for legs 12 and 16 for the legs 13. The sleeves 15 and 16 may be welded or otherwise secured to the underside of platform 14 and a set screw 17 may be threadably positioned through the wall of each sleeve to engage the leg 12 or 13 in its adjusted position. Obviously the platform 14 may be raised or lowered to a degree and the tripod arrangement may also be utilized to place the platform 14 at a horizontal position irrespective of irregularities in the supporting surface 10. My invention further contemplates the use of a plurality of such tripod stands and particularly the cooperative employment of a pair of stands, the second of which has legs of a slightly different length than that of the first, as shown in Figs. 1 and 2. It is to be understood that pairs of my support devices have utility and cooperative function even though the legs are of exactly the same length, since the stands may be closely coupled with the angular legs of one stand divergently disposed relative to those of the other regardless of the relative heights of the stand. However, when one of the stands is arranged with its legs in shorter condition, it is possible for the stands to be moved into interfitting relation with the outwardly extending legs of the higher stand overlying those of the shorter stand, yet achieving close-coupled alignment as will be set forth later in this specification.

On the upper surface of the platform 14 is disposed in upstanding relation an extendible jack member 18 which is preferably of the scissors type, having pivotally connected links 19 and a horizontal screw 20 for forcibly extending and retracting the jack 18 as is known in the art. A top bearing member 21 is attached to the upper extendible end of the jack 18 so that the top may be raised or lowered with respect to the supporting surface 10 irrespective of the vertical adjustment of legs 12 and 13.

Attached to the top of jack 18 is a cradle member indicated generally at 22 as shown in Figs. 1 and 2, and in enlarged detail in Figs. 3 and 4. The cradle member in turn has a U-shaped mount 23 which has upwardly diverging sides 24 and a base 25 rigidly secured thereto. The base 25 is pivotally mounted at 26 to the top 21 of jack 18 and an adjustment screw 27 is threadably mounted in the plate 21 at each side of the pivot 26 with the upper end 28 in bearing engagement with the underside of plate 25 and the lower end 29 being provided with a radial handle 30 as shown in Figs. 3 and 4. A lock nut 31 is threadably secured to the adjusting screw 27 and adapted to engage the underside of plate 21 for maintaining the screw in proper position. When it is desired to tilt the U-shaped mount 23 to the left as viewed in Fig. 3, the left adjusting screw is lowered while the adjusting screw 27 to the right is raised to rigidly tilt the mount for a purpose to be subsequently described. Each side 24 of the mount has an intermediate cut-away area formed by the V-shaped notch 32 of Fig. 4 to permit a lower portion of pipes and fittings to extend thereinto for free rotation. The rotatable members of the cradle comprise rollers which lie in spaced relation to define a lengthwise trough and also an intermediate space laterally positioned with respect to the lengthwise trough. To attain the proper spacing, an individual roller 33 is journaled on a stub shaft 34 which in turn is fastened to the side plate 24 by means of nut 35. The roller 33 is preferably a beveled wheel and may be provided with roller bearings (not shown) or other means for permitting free rotation of the rollers on their stub shafts 35 as shown. Since the side plates 24 are somewhat divergent, the wheels or rollers 33 will likewise be divergent at their upper ends so as to minimize the amount of dirt and metal particles which will find their way into the bearing structure of the roller and hamper its free rotation as well as to cause undue wear if not thus minimized. Four of the rollers 33 are provided for each cradle and the individual rollers are spaced in pairs as shown in Fig. 4, so that the outer circumferences of the rollers are opposed and the axes run longitudinally of the stand as shown. Another pair of the rollers is disposed in spaced relation on the other side plate 24 and these second rollers may be identically spaced and have identical structure with the first mentioned rollers. It is understood, of course, that the pairs of rollers need not have the same diameters as long as an aligned trough is formed by their positioning as will be described in the function of the supporting device.

My cradle device contemplates reception of pipe and pipe fittings in aligned and concentric relation, an illustrative arrangement showing a pipe member 36 having a reduced end 37 with a beveled edge 38 in concentric alignment with another smaller pipe 39, the latter likewise having a beveled edge 40 adapted to lie in abutting relation with the beveled edge 38 for tacking and welding. In some instances, it is desired to hold one or the other of the work pieces in non-rotatable condition. I therefore provide a simple clamping arrangement in the form of a flexible wire or cable 41 secured to a tension spring 42 which in turn is fastened to one edge 43 of the jack top 21 and extendible over the work piece 36 to a fastened relation under tension with the opposite edge of the jack top 21, as shown in Figs. 1 and 2. The means for fastening may constitute a tightening clamp 44 which in turn comprises a hook member 45 and a link 46 pivotally interconnected with a handle 47 at points 48 and 49. The link 46 may be pivotally connected at 50 to the opposite edge of the jack top 21. The looped end of wire 41 is secured to the hook 45 with the handle 47 in raised position, and when the handle 47 is depressed the wire or cable 41 will tension the spring 42 and firmly clamp pipe 36. Cables 41 of different length may be utilized for pipes of different diameters.

Although a plurality of the aligning and support devices may all be provided with clamps, jacks and tilting cradles, I have found that a useful combination employs one of a simplified form without jack or tilting cradle and one or more of the devices with the jack and tilting cradle but having the clamping element available should it be required. One simplified device and one with the jack and tilting cradle are preferably employed for supporting the most remote portions of the pipe assemblies from the joint to be welded. Another aligning and support device having the jack and tilting cradle is preferably utilized adjacent the abutting joint to be welded and brought to the proper height and adjustment to align the pipes. Fig. 1 thus shows an aligning and support device without the tilting and jack mechanism but having the clamping element for the larger pipe 36, and the shorter aligning and support device is provided with the jack and tilting cradle for supporting and aligning the pipes at the joint to be welded. The clamping device is employed particularly where a fitting such as an elbow has already been welded to the remote end of a pipe and the torque imparted to the pipe would cause the pipe to turn until the fitting reached its lowermost position. The clamp permits the fitting and pipe to be turned to any position regardless of the torque imparted by the weight of the fitting.

In the use and operation of my support devices, a tripod stand is elevated and leveled on the floor 10 at a convenient height and with the cradle thereof in the desired horizontal position. The first tripod stand or aligning and supporting device may constitute a simplified form without the tilting cradle and jack arrangement. A second aligning and supporting stand, with the tilting cradle and jack arrangement, is then positioned at the opposite end of the pipe assembly and adjacent the joint to be welded. If the piece to be welded is a short fitting or short length of pipe it may not be necessary to use further stands. However, if the work piece to be added is of long length, then another or third support stand, with cradle and jack arrangement, may be employed at the opposite end of the entire assembly. The second and third stands are then adjusted and leveled to the same elevation as the first stand with the axis of the pipes, when concentric alignment is desired, on the same elevation. The second or intermediate stand having the tilting cradle and jack arrangement is then adjusted so as to bring into alignment the pipes or fittings at the abutting joint. Where a second pipe or a fitting having a lesser diameter is to be welded to another having a greater diameter, the cradle is tilted as previously described and illustrated in Fig. 3. It will be noted that no adjustment of the roller members 33 need be made since the lower position in the lengthwise trough automatically provides for reception of a pipe having a greater diameter without raising its axis relative to that of the smaller pipe 39. The cradle, of course, can be tilted to accommodate differences in diameter to any reasonable degree and the rotatability of the pipe is not impaired by the tilting of the cradle.

Where the pieces to be welded are short, the support devices may be brought into close-coupled relation as shown in Figs. 1 and 2, and the joint to be welded is preferably disposed at an intermediate position in the trough formed by the pairs of rollers so that the concentric relation may be maintained and yet the lateral space provided across the trough will be adequate for the welder in tacking and welding the joint. In a typical instance, the pipe joint is tacked at the top and bottom without rotating the work pieces and then the work pieces are rolled 90 degrees and another tack made at the newly positioned top and bottom of the pipe joint. A level and a straight edge may be employed to maintain alignment horizontally at both the top and sides. Additional tacks may be accomplished, especially if the pipe is of large diameter. After the pipe joints have been tacked by the welder at spaced circumferential points, the final welding is accomplished by progressing along an arc which faces upwardly and is conveniently positioned for the workman whether he is using a gas welding device or electrically operated welding equipment. When the circumferential arc has progressed to a position where it is no longer convenient, the work pieces are rotated in their aligned and cradled relation so as to bring up a new unattached arcuate portion and the weld is continued until the joint is completely welded throughout its circumference.

It may thus be seen that I have devised a support device which will accommodate pipes and fittings at a convenient elevation while bringing into and maintaining the pipes and fittings in alignment irrespective of variations in diameter and, in conjunction with one or more similar devices, performs a useful cooperative function in both close-coupled work and long lengths of work to efficiently and rapidly weld the joints without discomfort to the welder and with a minimum of preparatory effort.

It will, of course, be understood that various changes may be made in the form, details, arrangement and proportions of the various parts without departing from the scope of my invention.

What I claim is:

1. A support device for holding pieces of pipe and the like in alignment for welding, comprising a stand adapted to be placed on a supporting surface such as a floor with a portion in elevated relation to said supporting surface, a cradle member mounted on the elevated portion of said stand, said cradle member having two pairs of rollers, the rollers of each pair being journalled thereon with the outer circumference thereof in opposed relation, each of said pairs lying in horizontally spaced relation with the other whereby to define a trough lengthwise of the axes of said rollers for receiving in alignment abutting pieces of pipe and the like to be welded, and further defining an intermediate space for access to the abutting joint of said pieces to be welded, and means for tilting said cradle member about an axis extending substantially perpendicular to said roller axes for permitting alignment of abutting pieces of pipe of different diameters into concentric relation with each other.

2. Portable apparatus for holding pieces of pipe and the like in alignment for welding comprising, a stand adapted to be placed on a supporting surface such as the floor with a portion in elevated relation to said supporting surface, a cradle member, means pivotally mounting said cradle member on the elevated portion of the stand for swinging about a substantially horizontal axis, said cradle member having upstanding sides respectively spaced in opposite directions outwardly from said axis, each side of the cradle member having journalled thereon, a pair of horizontally spaced rollers having parallel rotation axes extending substantially perpendicular to the swing axis of the cradle member, each pair of rollers defining a trough for supporting a piece of pipe with the longitudinal axis of the pipe extending substantially perpendicular to the swing axis of the cradle member, whereby the abutting ends of the pieces of pipe may be moved into alignment by swinging the cradle and may then be rotated on the rollers to permit welding of the pipes together.

References Cited in the file of this patent

UNITED STATES PATENTS

| | | |
|---|---|---|
| 768,987 | Graf | Aug. 30, 1904 |
| 999,982 | Fraser | Aug. 8, 1911 |
| 1,227,105 | Barnes | May 22, 1917 |
| 2,047,190 | Blickman | July 14, 1936 |
| 2,227,688 | Wood | Jan. 7, 1941 |
| 2,278,250 | Diesbach | Mar. 31, 1942 |
| 2,373,163 | Cailloux et al. | Apr. 10, 1945 |
| 2,500,204 | Ronay | Mar. 14, 1950 |
| 2,628,397 | Olson | Feb. 17, 1953 |
| 2,682,244 | Fortner | June 29, 1954 |
| 2,733,330 | Blewett | Jan. 31, 1956 |